United States Patent [19]

Offord

[11] Patent Number: 5,522,048
[45] Date of Patent: May 28, 1996

[54] LOW-POWER AREA-EFFICIENT AND ROBUST ASYNCHRONOUS-TO-SYNCHRONOUS INTERFACE

[75] Inventor: Glen E. Offord, Macungie, Pa.

[73] Assignee: AT&T Corp., Murray Hill, N.J.

[21] Appl. No.: 159,178

[22] Filed: Nov. 30, 1993

[51] Int. Cl.⁶ ...................................... H04L 7/00
[52] U.S. Cl. ..................... 395/280; 375/354; 375/362
[58] Field of Search .................................. 375/117, 118, 375/121; 395/325

[56] References Cited

U.S. PATENT DOCUMENTS

| | | | |
|---|---|---|---|
| 4,851,710 | 7/1989 | Grivna | 307/269 |
| 4,949,361 | 8/1990 | Jackson | 375/118 |
| 4,962,474 | 10/1990 | Kreiser | 364/900 |
| 5,125,089 | 6/1992 | McCambridge | 395/550 |
| 5,179,349 | 1/1993 | Endo | 328/74 |
| 5,191,657 | 3/1993 | Ludwig et al. | 395/325 |
| 5,208,809 | 5/1993 | Fergeson et al. | 370/91 |
| 5,268,934 | 12/1993 | Sharma et al. | 375/117 |
| 5,331,669 | 7/1994 | Wang et al. | 375/118 |
| 5,339,395 | 8/1994 | Pickett et al. | 395/310 |
| 5,379,327 | 1/1995 | Sharma et al. | 375/121 |

*Primary Examiner*—Jack B. Harvey
*Assistant Examiner*—David A. Wiley

[57] ABSTRACT

An asynchronous to synchronous interface between a master chip and a target chip, the interface being located on the target chip, includes a synchronous write logic unit and one set of synchronous transfer latches. A system clock (clock on target chip) and asynchronous clock signal are connected to the synchronous write logic unit. The asynchronous clock signal is also connected to a set of asynchronous latches, which receive data from the master chip upon receiving active asynchronous clock signals. The asynchronous latches are connected to a set of synchronous latches. The synchronous latches are controlled by a synchronous write signal generated by the synchronous write logic unit. Based on the asynchronous write signal and clock signal of the target chip the synchronous write logic unit synchronously transfers data from the outputs of the asynchronous latches to the outputs of the synchronous latches.

8 Claims, 4 Drawing Sheets

5,522,048

LOW-POWER AREA-EFFICIENT AND ROBUST ASYNCHRONOUS-TO-SYNCHRONOUS INTERFACE

BACKGROUND OF THE INVENTION

1. Field of the Invention

The present invention relates generally to an asynchronous-to-synchronous interface between two chips. More particularly, the present invention relates to an asynchronous-to-synchronous interface between a microprocessor and a target chip where the transfer of data to the target chip from the microprocessor is in parallel.

2. Related Art

Many computer-based integrated circuit (IC) chips are interfaced to a master chip. Often, the target chip has a clock that is running at a different speed or phase than the clock of the master chip. When the master chip transfers data (e.g., address, control, data, etc.) to the target chip, the two chips must be synchronized in some fashion. This problem is called asynchronisity.

One conventional solution to the asynchronisity problem is to transfer data from the master chip to target registers (on the target chip) with a write pulse which is a function of the timing characteristics of the master chip (known as synchronous write architectures or interfaces). Such synchronized interfaces are small in area and require little power. They can also operate cleanly, because metastability is transferred from the data path to the control path. On the downside, synchronous write architectures require an active clock to write to registers on the target chip and typically the minimum guaranteed write-to-write time is two clock periods (one clock period due to asynchronism and one period accounting for internal writing on the target).

Another conventional solution to the asynchronisity problem is to employ an asynchronous write system architecture as an interface between the two chips. In such a system, no clock is required to write to registers on the target chip, but a clock is required to synchronously transfer (if desired or required) data from the target registers to the internal parts of the target chip.

An example of an asynchronous write system architecture is shown in FIG. 1, which is a block diagram illustrating a standard asynchronous-to-synchronous interface 100 employed on a target chip 102. The target chip 102 is coupled to a microprocessor chip (master, not shown). The microprocessor (sometimes referred herein as the master chip or central processing unit) communicates with the target chip 102 by transferring data bits, control bits and address bits to the target chip 102. The data bits are typically some form of numeric or alphanumeric binary code that is processed in an implementation dependent manner by logic circuits (not shown) on the target chip 102. The control signal includes a clock signal (referred to as an asynchronous write signal, because the internal clock 118 of the target chip 102 and the internal clock, not shown, of the microprocessor operate at different speeds) generated by the microprocessor. This clock signal controls when the data bits are written into the target chip 102. The address bits specify a location in the target chip 102 where the data bits are to be written. The data bits are transferred in parallel via bus 112. The control signal is transferred via a bus 114 and the address bits are transferred via a bus 113, the data bus 112 is N bits wide. The address bus 113 is M bits wide, and the control bus 114 is C bits wide. N is often 8-bits, $2^M$ is the address space, and C is often 3-bits (Chip Select, Write and Read). The data and address may also be time multiplexed on the same bus.

The target chip and the microprocessor chip operate at different speeds and/or unknown phasing. The microprocessor transfers data to the target chip 102 at a rate controlled by the microprocessor chip. The target chip 102 writes the data (transferred from the microprocessor) to logic circuits located on the target chip 102 with a timing controlled by the target chip 102 (specifically, at a timing determined by an internal clock 118 of the target chip 102).

To solve this asynchronisity problem, the target chip 102 employs a conventional interface shown as 100. The interface 100 includes: an internal clock 118, edge triggered latches 104A–N, 106A–N, and 108A–N, an address decoder 110 and AND gates 116A–N. N is equal to the width of the data bus 112, such that there is one latch 104A–N, for example, for every data bit transferred over the data bus 112. In this example, latches 104, 106 and 108 are edge triggered flip-flops.

The address decoder 110 is comprised of standard address decode circuitry (e.g., typically gates). Multiple address bits travel in parallel on bus 113 from the microprocessor (not shown) to the address decoder 110. The address decoder 110 responds by activating (that is, setting to a logical high value, or to a logical 1 value) one of its outputs 140A–N. Generally, one and only one of the output terminals 140A–N will be activated for each possible address. When a rising edge of the asynchronous write signal is transferred via bus 114 to the AND gates 116A–N, on the next trailing edge of the asynchronous write signal, this latch 104A–104N latches in the data bit present on the data bus 112. In this manner, data bits are asynchronously transferred from the microprocessor to the target chip 102 and, in particular, to the latches 104A–N of the target chip.

As will be appreciated, the latches 104 are not sufficient by themselves to latch in the data bits, because they are asynchronous to the target chip. To synchronously transfer the data in latches 104, another bank of latches, 106, accepts the asynchronous data presently in latches 104 at a clock edge from clock 118. This is still insufficient to guarantee robust synchronous transfer because of metastability.

Metastability is the condition where data on the bus 112 arrives at a latch 104 simultaneously with a rising edge of the asynchronous write signal. A single latch 104 would propagate possibly incorrect data if metastability occurs. The latches 104, 106, 108 in each data path alleviate metastability by preventing possibly incorrect data from being propagated to logic circuits (now shown) in the target chip. Specifically, each latch 104 is connected in series to a latch 106/latch 108 pair (equivalently, a latch 106/latch 108 pair is associated with each bit transferred over the data bus 112). Latches 106 and 108 are controlled by the internal clock 118 to enable the synchronous transfer of data from the latches 104 to other logic circuits in the target chip 102 (denoted as "To Target Chip Logic" in FIG. 1.)

Listed below are several undesirable aspects of the standard architecture interface 100 shown in FIG. 1. The problems are as follows: (1) Two latches 106A–N and 108A–N are required for each data bit which is to be synchronized (that is, each data bit transferred via the bus 112). Where the data bus 112 is 16-bits wide, 32 latches (flip-flops) 106, 108 are required. That is, the conventional interface 100 requires substantial "real estate" (i.e., chip area) on the chip 102. (2) The clock signal produced by clock 118 must drive two latches 106A–N, 108A–N per synchronized bit, in addition to other flip-flops on the chip 102. Consequently, substantial power is dissipated (power burn) by chip 102 from the need to drive so many flip-flops. Additionally, chip 102 also consumes excessive power due to capacitance caused by routing data between latches 106A–N, 108A–N. Such capacitance is often aggravated by the need to widen high speed internal clock runners for electromigration abatement. (3) Ambiguous data—For instance, it is possible for latches 106 and 108 to propagate incorrect data (e.g., not before or after data values for one clock cycle). Specifically, the data 112 propagated through 104 may be changing at the time the data is latched into latches 106 with some data values at their new values and some still at their old values. Neither the complete original data values nor the new data values are clocked into latches 106 and subsequently into latches 108 for one clock cycle. This problem is aggravated if latches 104 are implemented as level sense flip-flops due to routing delay differences in data bus 112; and still remains if latches 104 are implemented as edge-triggered flip-flops due to asymmetrical rise and fall times in latches 104. And (5) latches 106A–N, 108A–N do not completely solve the metastability problem.

Therefore, what is needed is an improved asynchronous-to-synchronous interface that does not suffer from the above-described problems associated with conventional interfaces.

SUMMARY OF THE INVENTION

The present invention is directed to an apparatus for providing an asynchronous to synchronous interface between a master chip and a target chip. The interface is located on the target chip. The interface includes a synchronous write logic unit and a set of synchronous transfer latches. A system clock located on the target chip and an asynchronous clock signal are connected to the synchronous write logic unit. The asynchronous clock signal is also connected through logic circuitry to a set of asynchronous latches, which receive data from the master chip upon receiving active (that is, logical high in one example) asynchronous clock signals. The asynchronous latches are connected to a set of synchronous latches. The synchronous latches are controlled by a synchronous write signal generated by the synchronous write logic unit. Based on the asynchronous write signal and a clock signal generated by the target chip, the synchronous write logic unit synchronously transfers data from the outputs of the asynchronous latches to the outputs of the synchronous latches.

One feature and advantage of the present invention is that the system clock (target clock) does not drive two sets of latches per data bit as in conventional techniques. Instead, the system clock is connected to the synchronous write logic unit. This eliminates significant power dissipation associated with directly driving two sets of synchronous latches during each clock cycle.

Another advantage of the present invention is that the present invention does not employ two sets of synchronous transfer latches per data bit. Instead, only one set of synchronous transfer latches are employed per data bit. This not only reduces power requirements of the target chip, it also reduces the area requirement of the asynchronous-to-synchronous interface on the target chip. Only half the number of transfer latches are needed according to the present invention, as compared with conventional asynchronous-to-synchronous transfer techniques.

A further advantage of the present invention is the use of level triggered flip-flops for asynchronous latches instead of edge triggered flip-flops as in conventional techniques, since level triggered flip-flops require less chip area and power.

Still another advantage of the present inventions is the ability to robustly transfer data without glitches and minimized metastability problems. Delay elements, "prevent partial latch circuitry" and "glitch preventor" circuitry in the synchronization logic unit of the present invention provide robust transfer of data from the master chip to the target chip.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 2:
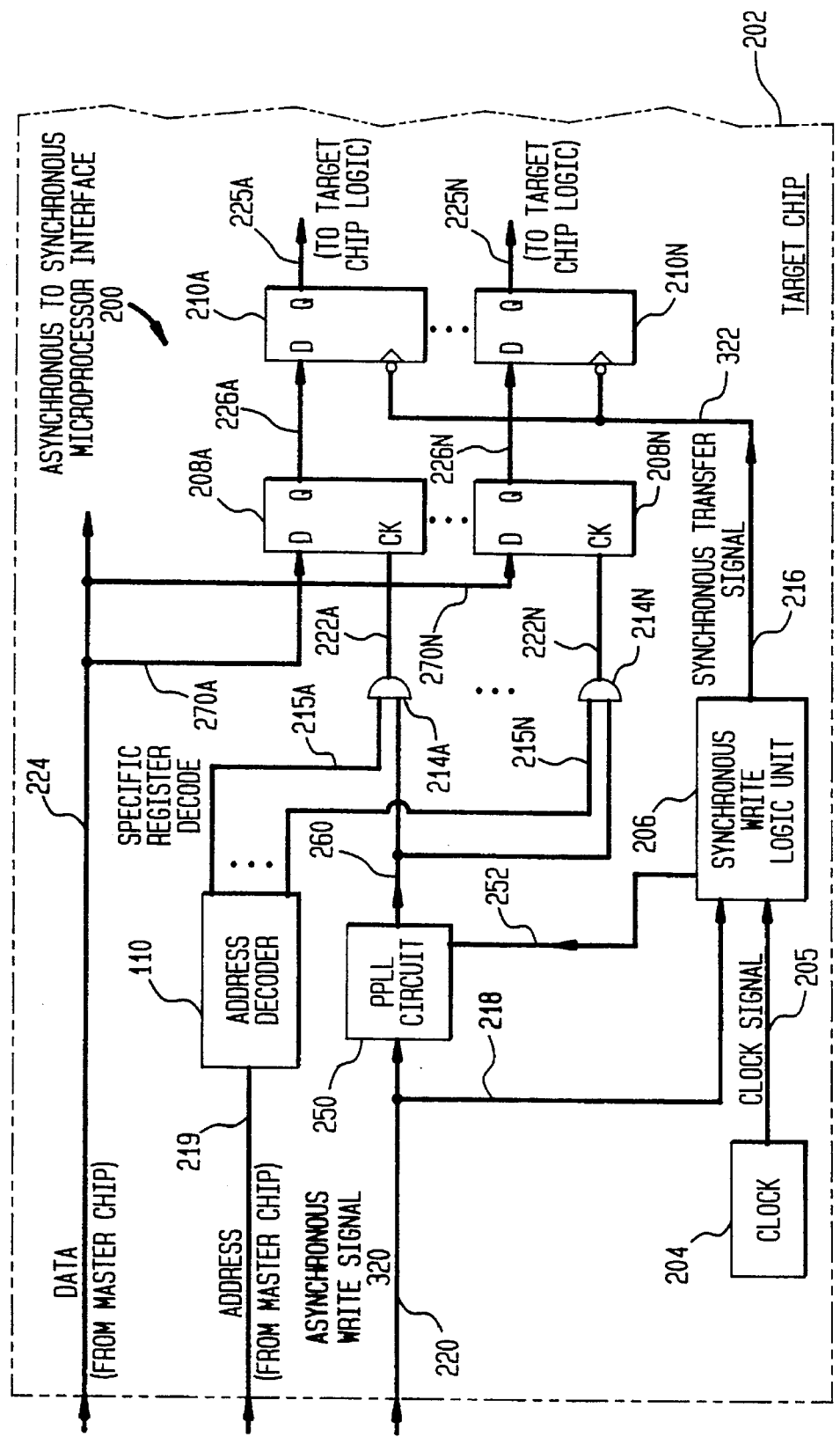
FIG. 2 is a simplified block diagram of an asynchronous-to-synchronous interface 200 employed on a target chip 202 according to a preferred embodiment of the present invention.

FIG. 2 is a simplified block diagram of an asynchronous-to-synchronous interface 200 employed on a target chip 202 according to a preferred embodiment of the present invention. The target chip 202 is coupled to a microprocessor (not shown). Alternatively, the target chip 202 may be coupled to any IC chip that transmits data (e.g., a master chip). In a preferred embodiment, the target chip 202 is a disk system servo chip, but may be any device that receives address, data, and control signals from another device.

Figure 1:
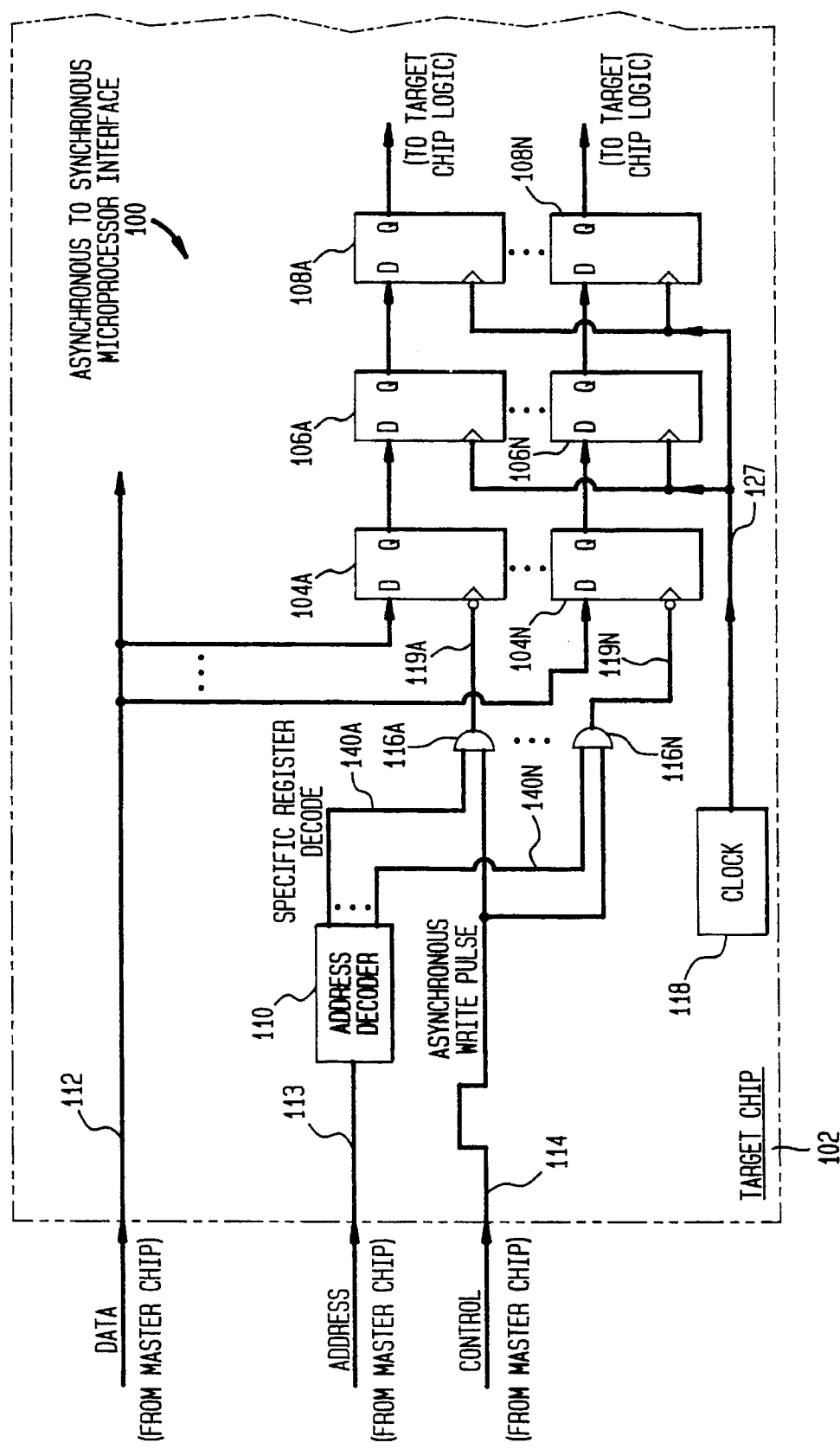
FIG. 1 is a block diagram of a conventional asynchronous-to-synchronous architecture interface employed on a target chip 102.

The interface 200 of FIG. 2 performs the same function (except as otherwise described herein) as the conventional interface 100 shown in FIG. 1. Data bus 224 and address bus 219 of FIG. 2 are the same as data bus 112 and address bus 113, respectively, of FIG. 1. Additionally, the structure and operation of the address decoder 110 of FIG. 2 is the same as that of the address decoder 110 of FIG. 1.

Although serving the same purpose, interface 200 is superior to interface 100. Interface 200 is more compact, requires less power, and is more robust. In particular, the target clock 204 in interface 200 does not drive two sets of latches per bit of the data bus 224, as was the case with the interface 100 in FIG. 1. Instead of driving these latches, the target clock 204 drives a synchronous write logic unit 206, thereby reducing power dissipation.

Also, the interface 200 of the present invention does not employ two sets of synchronous transfer latches 106A–N, 108A–N per bit as in FIG. 1. Instead, only one set of synchronous transfer latches 210A–N are employed per bit. This not only reduces the power requirements of the target chip 202, it also reduces the area requirement of the asynchronous-to-synchronous interface 200 on the target chip 202. This is the case, since only half the number of transfer latches are needed according to the present invention as compared with conventional asynchronous-to-synchronous transfer techniques as shown in FIG. 1.

The asynchronous-to-synchronous microprocessor interface 200 includes: an internal clock 204, a synchronous write logic unit 206, latches 208A–N, 210A–N, an address decoder 110, a write decoder implemented as AND gates 214A–N and prevent partial latch logic (PPLL) circuitry 250.

The operation of the asynchronous to synchronous interface 200 will be described with reference to FIG. 3, which is a timing diagram comprising three example signals: an asynchronous write signal 320, a synchronous transfer signal 322 and a target clock signal 324. Signals 320, 322, 324 are shown to demonstrate the operation of interface 200.

The asynchronous write signal 320 is a control signal generated by the master chip (not shown) and is transferred to the target chip via bus 220. The asynchronous write signal 320 is referred to herein as "asynchronous," because it is asynchronous to the control timing of target chip 202 (that is, it is asynchronous to the clock signals generated by the clock 204). The asynchronous write signal 320 controls when data is written from the microprocessor or master chip to the target chip 202.

The synchronous transfer signal 322 determines when data is transferred from the interface 200 (and, specifically, from the latches 208) to the processing logic circuitry in the target chip 202 (denoted as "To Target Chip Logic" in FIG. 2) connected to the latches 210. The synchronous transfer signal 322 (which travels on wire 216) is generated by the synchronous write logic unit 206. Since the synchronous write logic unit 206 generates the synchronous transfer signal 322 from, in part, the clock 204 (described below), the synchronous transfer signal 322 operates to control the latches 210 such that data is effectively synchronously transferred from the microprocessor to the processing logic circuitry connected to the latches 210.

The target clock signal 324 is an internal clock signal generated by clock 204 to control the operation of the target chip 202.

The synchronous write logic unit 206 receives the asynchronous write signal 320 via wire 218 and the target chip clock signal 324 via wire 205. Based on signals 320 and 324, the synchronous write logic unit 206 generates the synchronous transfer signal 322 in a manner which shall now be described in detail.

Generally, in a preferred embodiment, the synchronous write logic unit 206 generates the synchronous transfer signal 322 in a predetermined manner such that the synchronous transfer signal 322 generally rises (see time 302 in FIG. 3, described below) with a rising edge of the asynchronous write signal 320, but falls with a rising edge of the target clock signal 324, where the falling edge of the synchronous transfer signal 322 causes the synchronous transfer of data into latches 210A–N from latches 208A–N. Thus, any rising edge (logic high in this example) of the asynchronous write signal 320 causes synchronous write signal 322 to go active (logic high). At any time when the asynchronous write signal 320 is inactive (logic low) during a rising edge of the target clock signal 324, the synchronous transfer signal 322 goes inactive (logic low). As noted above, this falling inactive edge of the synchronous transfer signal 322 causes the transfer of the asynchronous write data from latches 208A–N to processing logic circuitry in the target chip 202 via latches 210A–N.

Figure 3:
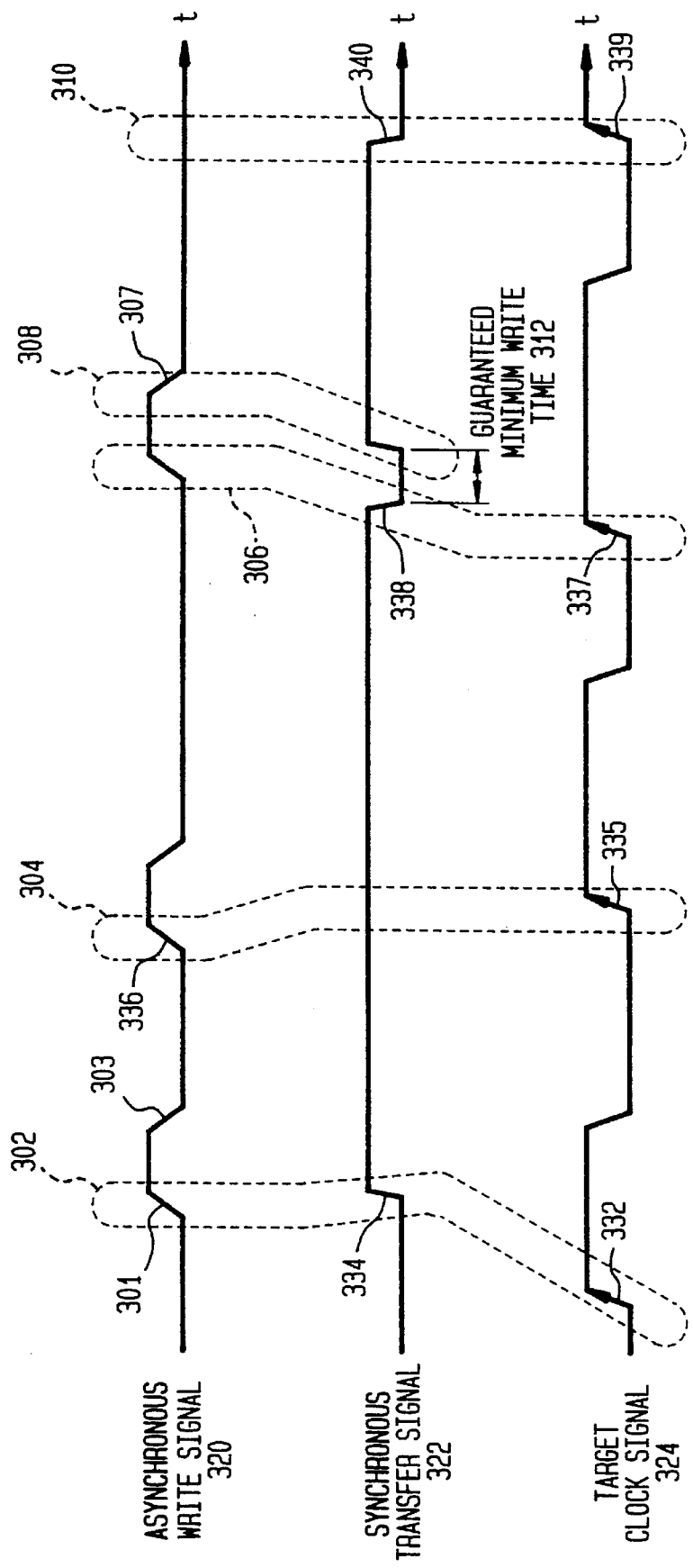
FIG. 3 shows three example signals: an asynchronous write signal 320, a synchronous transfer signal 322 and a target clock signal 324. These signals are used to illustrate the operation of the present invention.

The operation of interlace 200 will become more apparent by examining the example signals in FIG. 3. At a period of time 302 shown in dotted lines, a rising edge 301 of the asynchronous write signal causes the synchronous write logic unit 206 to generate a rising edge 334 of the synchronous transfer signal 322, such that data is prevented from entering latches 210A–N from the latches 208A–N. This is the case, since latches 210A–N in this example are negative edge triggered flip-flops.

Also at time period 302, when the asynchronous write signal 320 goes high at point 301, data from bus 224 is transferred to a particular one of the latches 208A–N via one of the AND gates 214A–N indicated by the address decoder 110 (as described above for the interface 100 of FIG. 1). Specifically, multiple address bits travel on bus 219 from the master chip to the address decoder 110. The address decoder 110 responds by activating one of its outputs 215A–N, which then selects (enables) one of the AND gates 214A–N inputs to be active (logic 1). Generally, one and only one of the output terminals 215A–N will be activated for each possible address. When the rising edge 301 of the asynchronous write signal 320 is transferred via busses 220, 260 to a particular AND gate 214A–N, the particular AND gate 214A–N is enabled producing a logic 1 at the output terminal 222A–N of the AND gate 214A–N. A logic 1 at the output 222A–N of AND gates 214 enables one of the latches 208A–N to receive data from the data bus 224. In a preferred embodiment, the data bus 224 is eight bits wide.

In a preferred embodiment, latches 208A–N are level sensitive flip-flops that transfer data to output terminals 226A–N when asynchronous signal 320 stays high for an extended period of time. A level sensitive flip-flop is employed in the present invention instead of an edge triggered flip-flop because it is smaller in area than edge triggered flip-flops.

At a period of time represented by dotted circle 304, the target clock signal 324 goes high. Normally, the synchronous transfer signal 322 would go low when the target clock signal 324 goes high, such that data would be enabled into latches 210 from the outputs of latches 208. However, in this example, a rising edge 336 of the asynchronous write pulse 320 occurs, such that data is latched into one of the latches 208 from data bus 224. Improper operation could result if data was also transferred from the latches 208 to the latches 210 during this time. Therefore, to avoid race conditions, glitching, and metastability problems, synchronous write logic unit 206 maintains the synchronous transfer signal 216 in a high state, as shown in FIG. 3, such that data is not transferred from the latches 208 to the latches 210.

At a period of time represented by dotted circle 306, rising edge 337 of the target clock 324 occurs. At time 306, the asynchronous write signal 320 is not active, such that data is not being transferred from the data bus 224 to the latches 208. Therefore, the synchronous write logic unit 206 generates a falling edge 338 of synchronous transfer signal 322. This latches the data present at the output 226A–N of latches 208A–N into latches 210A–N. This data latched into latches 210A–N is then present on the output terminals of latches 210A–N.

The synchronous write logic unit 206 maintains the synchronous transfer signal 322 in a low state after the falling edge 338 for a predetermined period of time 312, so that data can be properly transferred from latches 208 to latches 210 even if the asynchronous write signal 320 goes high during this time as shown in 308. In a preferred embodiment the guaranteed minimum write time 312 is approximately 10 nanoseconds, which is five times faster than most asynchronous write pulses can occur in succession for C-MOS designs. Thus, synchronous write logic unit 206 guarantees that there will be no glitching. The advantage is if asynchronous write pulses occurs faster than logic inside interface 200 can handle or during clock 324 active edges, then synchronous write logic unit 206 guarantees that data from a previous clock cycle is transferred by latch 210 to output terminal 225. Synchronous logic unit 206 guarantees transfer by holding off the transfer (322 going low) until a suitable time (the asynchronous clock 320 is not active when the target clock generates an active clock edge).

The rising edge 339 of clock 324 at point 310 (shown in dotted lines) causes synchronous write logic unit 206 to generate a falling edge 340 of synchronous transfer signal 322. The synchronous transfer signal 322 remains low until the next rising edge of the asynchronous write signal 320. Thus, data from the previous asynchronous write signal at edge 307 will be transferred from latches 208A–N to latch as 210A–N at the falling edge 340 of synchronous transfer signal 322.

Figure 4:
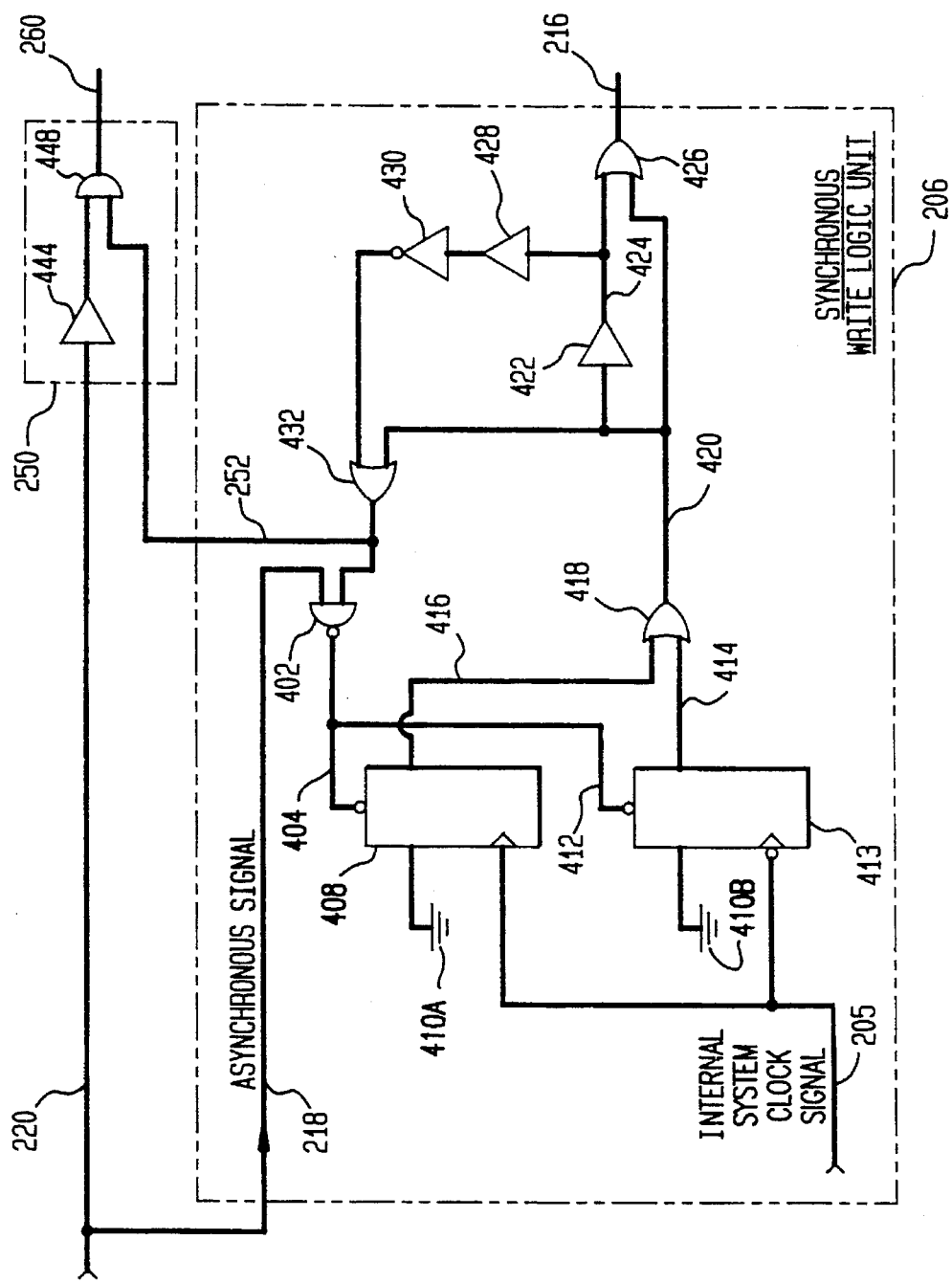
FIG. 4 is a circuit diagram of a synchronous write logic unit 206 according to an embodiment of the present invention.

The implementation of the synchronous write logic unit 206 will now be described in more detail. FIG. 4 is a circuit diagram of the synchronous write logic unit 206 according to one embodiment of the present invention. Synchronous write logic unit 206 includes: a NAND gate 402, flip-flops 408 and 413, NOR gates 418, 426, 432, delay elements 422, 428, 444 and an inverter 430. The asynchronous write signal enters synchronous write logic unit 206 on wire 218 and the target clock signal enters synchronous write logic unit 206 on wire 205. Based on these two signals write logic unit 206 generates an active or inactive synchronous write signal on wire 216. Additional, logic elements 444 and 448 (which are shown as 250 in FIG. 2) prevent partial latching as will be explained in more detail below.

An asynchronous pulse high (this means that a write has been initialized by the master chip) via bus 218 causes a low logical value at the output 404 of NAND gate 402. A low output from NAND gate 402 presets flip-flop 408 to a logic high value, since the output of the NAND gate 402 is connected to a preset terminal of the flip-flop 408 (the operation of flip-flop 413 is similar to flip-flop 408 except that it is negative edge triggered). In turn, flip-flops 408 and 413 generate active signals (e.g., a logic high signal), which are sent to OR gate 418 via busses 416 and 414, respectively. The input terminals of both flip-flops 408 and 413 are tied to ground via 410A and 410B, respectively. Flip-flop 413 and OR gate 418 are employed for metastability purposes only. In other words, flip-flop 413 and OR gate 418 allow one half clock cycle of metastability resolution time. The active signal that enters OR gate 418 is transferred to the OR gate 426 via bus 420 to generate an active high synchronous write logic signal via wire 216.

The next clock edge of the target clock signal via wire 205 causes either the output 416 of flip-flop 414 or output 414 of flip-flop 408 to go low provided the asynchronous write signal is inactive. The next clock edge ensures both signals on wire 412 and 414 are low. Accordingly, OR gate 418 generates a low signal and transfers it to OR gate 426 via 420 causing OR gate 426 to generate a low synchronous write signal on wire 216 after a time defined by delay element 422. This causes the transfer of data in flip-flop 210 of FIG. 2.

Once the synchronous write signal goes low via wire 216, even if an asynchronous write 320 were to occur at the same time, it would by held off for a guaranteed low time. For instance, delay elements 428, 430 guarantee low time at output 216 of OR gate 426. If an asynchronous write pulse occurs at the same time, then NAND gate 402 blocks out the write pulse for guaranteed delay time of elements 428 and 430. Thus, if synchronous write logic unit 206 has started a synchronous write, and even if an asynchronous write were to occur at the same time, the synchronous write logic unit 206 would hold the asynchronous write pulse off for a guaranteed low time equal to delay of element 428.

Delay element 422 prevents race conditions from occurring at the output 216 of synchronous write logic unit 206. In other words, delay element 422 prevents a glitch condition occurring at the output of NOR gate 426. Delay element 426 insures that the synchronous transfer signal via wire 216 remains high until NAND gate 402 is locked out preventing an asynchronous write signal from immediately causing the synchronous transfer signal via wire 216 to go high after the synchronous write transfer signal had just gone low.

Delay element 444 and AND gate 448 prevent garbage from being propagated along bus 220. For instance, during the falling edge of a synchronous write signal, delay element 444 and AND gate 448 ensure that an asynchronous write pulse of the asynchronous signal is locked out so as to prevent an asynchronous write to occur at the same time as a synchronous write occurs.

It should be noted that flip-flop 413 and NOR gate 418 are not required for synchronous write logic unit 206 to function. It should also be noted that other logic elements that perform the same or similar functions could be substituted of the circuitry of block 206.

One skilled in that art will appreciate that the present invention can be practiced by other than the embodiments described, which are present for purposes of illustration and not of limitation, and the present invention is limited only by the claims that follow.

What is claimed is:

1. An apparatus for providing an asynchronous to synchronous interface between a master chip and a target chip, comprising:

a first set of latches, having first and second input terminals and an output terminal, said first input terminal coupled to an asynchronous write signal from the master chip and said second input terminal coupled to a data bus for transferring data, said first set of latches operable to transfer data from said second input terminal to said output terminal upon receiving an active asynchronous write signal;

a synchronous write logic unit, having first and second input terminals and an output terminal, said first input terminal coupled to the asynchronous write signal and said second input terminal coupled to a clock signal of said target chip, said synchronous write logic unit for generating a synchronous write signal at said output terminal of said synchronous write logic unit in accordance with the asynchronous write signal and the target chip clock signal;

a second set of latches, having first and second input terminals and an output terminal, said first input terminal of said second set of latches coupled to said output terminal of said first set of latches and said second input terminal of said second set of latches coupled to said synchronous write logic unit;

wherein said synchronous write logic unit generates an inactive synchronous write signal when said asynchronous write signal goes active and generates an active synchronous write signal when said clock signal goes active and said asynchronous write signal is inactive, where said active synchronous write signal causes said second set of latches to transfer data from said first set of latches to the output terminals of said second set of latches.

2. The apparatus of claim 1, wherein said synchronous write logic unit comprises delay elements for generating said active synchronous write signal for a predefined minimum time even if an active asynchronous write signal were to occur while generating said active synchronous write signal.

3. An apparatus for providing an asynchronous to synchronous interface between a master chip and a target chip, the apparatus located on the target chip having an internal system clock, the master chip connected to the target chip having a clock which is asynchronous to the system clock, the apparatus comprising:

first latches, coupled to the master chip and the asynchronous clock, for receiving data transferred in parallel from said master chip when the asynchronous clock generates an active write signal;

means, coupled to said asynchronous clock and said system clock, for generating an inactive synchronous transfer signal when the asynchronous clock generates an active write signal and for generating an active synchronous transfer signal after the asynchronous clock generates an inactive write signal and the system clock changes from an inactive state to an active state; and second latches, coupled to said means and said first latches, for receiving data transferred from said first latches when said synchronous transfer signal is active.

4. The apparatus of claim 3, wherein said generating means guarantees a predefined minimum time for said second latches to receive data from said first latches by generating an active synchronous transfer signal for said minimum time.

5. The apparatus of claim 4, wherein said generating means generates an inactive synchronous transfer signal if the asynchronous clock generates another active write signal.

6. The apparatus of claim 3, wherein said first latches are level sensitive flip-flops.

7. The apparatus of claim 3, wherein said second latches are edge triggered flip-flops.

8. The apparatus of claim 4 wherein said generating means comprises delay elements for guaranteeing said minimum time.

\* \* \* \* \*